United States Patent Office 3,215,524
Patented Nov. 2, 1965

3,215,524
METAL RECOVERY
Charles A. Fetscher, Short Hills, and Stanley A. Lipowski, Livingston, N.J., assignors to Nopco Chemical Company, Newark, N.J., a corporation of New Jersey
No Drawing. Filed Feb. 20, 1963, Ser. No. 260,052
14 Claims. (Cl. 75—106)

The prsent invention relates to the extraction and recovery of metals from solutions containing metals as cyanide complexes.

Complex cyanides of metals are among the most stable complexes known. These complexes, particularly of the heavy metals, are commonly formed in electroplating baths by addition of a cyanide to same. In these complexes, the cyanide forms a firm complex with the metal and only the merest trace of free metal exists in equilibrium with the complex. This extremely minute concentration of free metal makes it possible to produce a smooth film deposit upon the cathode. Also, the great stability of complex cyanides is of practical use in the extraction of gold and silver from their ores. That is, these metals are recovered by dissolving them in a cyanide solution. However, it is oftentimes desired to recover the unused metal from the electroplating bath, the rinse water or the like or to remove contaminants from the same or to recover the gold or silver from their cyanide complexes. Unfortunately, the stable cyanide complex with the metal makes this very difficult. This is because in the presence of cyanide ion there is too low a concentration of free metal to combine with, e.g., a cation exchange resin or a chelating resin. This problem is particularly acute in the case of loss of gold from cyanide plating baths and rinse baths. However, the same problem arises in the case of other metals which form stable complexes with cyanide.

The above problem is illustrated by the following attempts to extract gold from a solution containing 1,000 p.p.m. of gold and 1% of sodium cyanide. The attempts were made using the following cation exchange resins: Dowex 50, Amberlite IR–12 and IR–120, and Permutit Q. Likewise, attempts were made to extract the gold with two resin chelators, namely, a polyamidoxime resin and a polyhydroxamic acid resin, which resins are known to chelate gold. However, it was found that neither the cation exchange resins nor the resin chelators were able to recover the gold, even when the solution was made acid to a pH of 3 with hydrochloric acid. This failure of cation exchange resins and chelators to extract metals from cyanide solutions is well known. Indeed, cyanide will leach heavy metals out of these resins.

Accordingly, it is an object of the present invention to recover metals, particularly heavy metals from their cyanide complexes in aqueous systems.

It is a further object to recover metals, particularly heavy metals, from their cyanide complexes from electroplating baths.

It is a further object to salvage valuable metals and to remove contaminating metals from aqueous systems, including electroplating baths.

Other objects of the invention will be obvious and will in part appear hereafter.

It has been unexpectedly discovered that the above as well as other objects can be successfully achieved by contacting aqueous systems containing cyanide complexes of metals with one or more water-soluble aldehydes or materials liberating same. By this manner, the metal is liberated from its complex and can then be rapidly and easily extracted by cation exchange resins or by resin chelators, such as polyamidoximes or polyhydroxamic acids. Although, it is known that cyanide, such as sodium cyanide, potassium cyanide, and the like will react with aldehydes, it was most unexpected to discover that the exceedingly stable cyanide complexes of metals, particularly those of the heavy metals, could be disrupted by treatment with aldehydes. The tight binding between the metal and the cyanide did not suggest the outstanding success of aldehyde in this process.

When carrying out the process, the water-soluble aldehyde which may be utilized can be formaldehyde, formalin, materials liberating formaldehyde, such as trioxane, paraformaldehyde, formaldehyde bisulfite addition product, etc., as well as other water-soluble aldehydes or materials liberating aldehyde, such as acetaldehyde, butyraldehyde, their bisulfite addition proucts, paraldehyde, etc. Formaldehyde is the preferred aldehyde in view of its low cost, high water solubility and high reactivity with the complex.

The amount of water-soluble aldehyde is at least stoichiometrically equivalent to the amount of cyanide present in the cyanide complex. Preferably, a considerable excess of aldehyde is used, e.g., at least about 10% and preferably 50% to 500% excess over the stoichiometric amount. Temperatures are not critical, i.e., the liberation of the metal can be carried out at room temperature or elevated temperatures, such as will occur in some electroplating baths. Likewise, this process can be carried out at temperatures below room temperature.

The pH at which the metal is liberated from the complex is not critical, i.e., the pH may range from about 1 to about 12.

Typical metals which form complexes with cyanide and which can be liberated therefrom by practice of this invention are as follows: silver, gold, copper, nickel, iron, mercury, cobalt, zinc, cadmium, manganese, rhodium, indium, platinum, palladium, chromium, ruthenium, vanadium and tungsten. Complexes of these metals are, as indicated above, well known and are characterized by their stability. Typical cyanide complexes of these materials, some of which are formed in electroplating baths, are shown by the following: $K[Au(CN)_4]$;

$Na[Ag(CN)_2]$; $K[Ag(CU)_2]$; $K_2[Zn(CN)_4]$;
$K_3[Fe(CN)_6]$; $K_4[Fe(CN)_6]$; $Na_2[Cd(CN)_4]$;
$K_2[Ni(CN)_4]$; $Na_2[Zn(CN)_4]$; $K_2[Cu(CN)_3]$;
$K_4[Mn(CN)_6]$; $K_3[Mn(CN)_6]$; $K_4[Co(CN)_6]$

After the aldehyde is introduced into the solution of the cyanide complex, it is allowed to remain therein for a time sufficient to release the metal from its cyanide complex, e.g., for from about two minutes to 25 hours. Preferably, stirring accompanies the aldehyde addition. Other materials, of course, can be present, such as the well-known additives which are present in electroplating baths, such as Rochelle salts, glues, surfactants and various proprietary brightening and leveling agents. As pointed out before, since the pH is not critical, these additives do not deleteriously affect the process.

Either simultaneously with the addition of the aldehyde or at any time thereafter, the solution of aldehyde and cyanide complex is contacted with a cation exchange resin or a chelating resin. In this way, the liberated metal can be exchanged by the cation exchange resin or chelated by the chelating resin. The quantities of resins are not critical. It is, of course, clear that sufficient quantities be used to efficiently remove all of the liberated metal. For example, the solution containing the aldehyde and the cyanide complex can be immediately, or after allowing for sufficient time to liberate the metal, passed through a column containing beadlets of the resin or through woven or non-woven filter cloths of the resin. The process for contacting the solution with the resin and for subsequently separating the resin from the metal free solution can obviously be varied in accordance with present methods for contacting solutions with these resins.

Subsequently, the cation exchange resins or chelating resins can be regenerated, i.e., the removed metal can be freed therefrom. For example, the cation exchange resin can be regenerated by treatment with dilute sulfuric or hydrochloric acid. The chelating resin can be regenerated by treatment with acids such as dilute sulfuric acid at pH's which do not exceed the pH at which the cation is chelated. However, the noble metals, i.e., gold, platinum and palladium as well as plutonium cannot be removed or eluted by acids from the chelating resins. In these instances, recovery of the metal is accomplished by destruction of the resin.

Useful cation exchange resins are phenol-formaldehyde resins having a phenol base and containing cationically active sulfonic acid groups such as Amberlite IR-100 and Dowex 30 and nuclear sulfonated styrene divinyl benzene resins such as Amberlite IR-120; Dowex 50; Permutit Q and Duolite C-25. However, it should be understood that these resins are merely exemplary and not limiting.

Examples of chelating resins are polyamidoxime resins and polyhydroxamic acid resins. These resins are described in U.S. application Serial Nos. 815,245, Fetscher, and 815,246, Fetscher, both filed May 25, 1959, now U.S. Patent Nos. 3,088,798 and 3,088,799, respectively, and application Serial No. 136,748, Fetscher et al., filed September 8, 1961. Further, these applications describe the chelation of metals including heavy metals and set forth the minimum pH of solutions containing same in order to chelate the metal and the maximum pH of the solution in order to elute the metal therefrom so as to regenerate the resin. Since the pH during treatment with the aldehyde is not critical, the pH can be adjusted before and during as well as after treatment with the aldehyde so as to obtain optimum pH for removal of the metal using the cation exchange resin or chelating resin. A further advantage of the chelating resins is that if the aqueous system contains a mixture of metals in the cyanide complexes, after the addition of aldehyde to liberate the metals, the chelating resins can be used to selectively extract the metals. This can be done as described in the aforesaid Patent No. 3,088,799 by adjusting the pH of the system so that one metal at a time can be removed. It should be understood that the present invention is not limited to recovery of the metal by resins as any other conventional recovery method may be used. However, use of resins represents a most practical and convenient means for this purpose.

The following examples are directed to preferred embodiments of this invention. It is to be understood, however, that these examples are merely illustrative of the invention and are not to be construed in a limiting sense.

Examples I through XII, XV through XVIII, XXIII, XXIV and XXV were carried out at room temperature.

EXTRACTION OF GOLD CYANIDE COMPLEXES

Example I 0.6 gram of aurochloric acid (HAuCl$_4$·3H$_2$O) was dissolved in 200 cc. of water and 3 grams of potassium cyanide then added. A complex of gold with cyanide was thus formed. Thereafter, 9 cc. of a 37% by weight aqueous solution of formaldehyde were added to a solution of the cyanide complex. Water was then added to bring the volume to 400 cc. Five grams of chelating resin, which was a polyhydroxamic acid resin in granular form prepared from polyacryloamidoxime and having 40% by weight of hydroxamic acid groups, were dispersed in the solution. The mixture was stirred for five hours and then filtered. The filtrate was analyzed for residual gold content. The analysis and other data obtained at the start and finish of the example are as follows:

|  | Start | Finish |
|---|---|---|
| pH | 11.9 | 12.5 |
| Gold content, p.p.m. | 750 | 14.4 |
| Percent gold extracted |  | 98.0 |

Example II

Example I was repeated except that formaldehyde bisulfite addition product was used in place of formaldehyde and 5 grams of chelating resin, which was a polyamidoxime resin in granular form prepared from polyacrylonitrile and containing 40% by weight of amidoxime groups, was used in place of the resin of Example I.

The formaldehyde bisulfite was prepared by mixing 9 cc. of a 37% by weight aqueous solution of formaldehyde with a solution of 12.5 grams of sodium bisulfite dissolved in 30 cc. of water. The analysis and other data which were obtained at the start and finish are as follows:

|  | Start | Finish |
|---|---|---|
| pH | 10.2 | 9.7 |
| Gold content, p.p.m. | 750 | 18.6 |
| Percent gold extracted |  | 97.5 |

Example III 0.6 gram of aurochloric acid was dissolved in 200 cc. of water and three grams of potassium cyanide were added. A complex of gold with cyanide was thus formed. Then, 11.5 grams of citric acid were dissolved in the mixture. 9 cc. of 37% by weight aqueous solution of formaldehyde were added. Water was added to bring the total volume to 400 cc. Five grams of the chelating resin of Example I were suspended in the solution. The mixture was agitated at room temperature for five hours and the solution then filtered and the filtrate analyzed for its residual gold content. The results were as follows:

|  | Start | Finish |
|---|---|---|
| pH | 3.2 | 3.8 |
| Gold content, p.p.m. | 750 | 105 |
| Percent gold extracted |  | 86 |

Example IV

Example II was repeated except that 11.5 grams of citric acid were added. The results were as follows:

|  | Start | Finish |
|---|---|---|
| pH | 3.2 | 3.4 |
| Gold content, p.p.m. | 750 | 22.9 |
| Percent gold extracted |  | 97 |

Example V 0.8 gram of aurochloric acid was dissolved in 200 cc. of water and 3 grams of potassium cyanide were added. A complex of gold and cyanide was thus formed. 9 cc. of 37% by weight aqueous solution of formaldehyde were added to the solution of the complex. Water was added to bring the total volume to 400 cc. Five grams of Dowex 50 cation exchange resin were suspended in the mixture and the mixture was stirred at room temperature for five hours. Thereafter, the solution was filtered and the filtrate analyzed for its gold content. The results were as follows:

|  | Start | Finish |
|---|---|---|
| pH | 11.7 | 12.1 |
| Gold content, p.p.m. | 1,000 | 11.4 |
| Percent gold extracted |  | 98.8 |

Example VI

Example V was repeated, except that the bisulfite formaldehyde product of Example II was used in place of the formaldehyde and Amberlite IR-100 was used as the cation exchange resin. The results of the analysis were as follows:

|  | Start | Finish |
| --- | --- | --- |
| pH | 10.5 | 9.3 |
| Gold content, p.p.m. | 1,000 | 11.6 |
| Percent gold extracted |  | 98.8 |

Example VII

Example V was repeated exactly except that 11.5 grams of citric acid were added to the mixture and 5 grams of Permutit Q cation exchange resin were used as the extractant. The results after five hours were:

|  | Start | Finish |
| --- | --- | --- |
| pH | 3.3 | 3.3 |
| Gold content, p.p.m. | 1,000 | 150 |
| Percent gold extracted |  | 85 |

Example VIII 0.8 gram of aurochloric acid was dissolved in 200 cc. of water and 3 grams of potassium cyanide were added. In this manner, a complex of gold and cyanide was thus formed. Formaldehyde bisulfite addition product was prepared as in Example II and in the same amount and added to the solution containing the gold cyanide complex. 11.5 grams of citric acid were then added to the solution. Water was added to bring the total volume to 400 cc. Five grams of Amberlite IR-120 cation exchange resin were stirred in the solution for five hours. The results of the analysis were as follows:

|  | Start | Finish |
| --- | --- | --- |
| pH | 3.4 | 3.4 |
| Gold content, p.p.m. | 1,000 | 44 |
| Percent gold extracted |  | 95.6 |

EXTRACTION OF COPPER FROM CYANIDE COMPLEXES

Example IX 1575 mg. of $CuSO_4 \cdot 5H_2O$ were dissolved in 200 cc. of water. Three grams of potassium cyanide were added followed by 11.5 grams of citric acid plus 1.6 grams of sodium citrate. In this manner, a complex of copper and cyanide was formed. Then 9 grams of formaldehyde were added. Water was added to bring the total volume to 400 cc. Ten grams of the chelating resin of Example II were dispersed in the solution and the mixture stirred for five hours at room temperature. The resin was removed from the solution by filtration and the filtrate analyzed. The results were as follows:

|  | Start | Finish |
| --- | --- | --- |
| pH | 4.5 | 5.8 |
| Copper content, p.p.m. | 1,000 | 1 |
| Percent copper extracted |  | 99.9 |

Example X

Example IX was repeated except that ten grams of Permutit Q resin was used as the extractant. The results were as follows:

|  | Start | Finish |
| --- | --- | --- |
| pH | 4.5 | 5.7 |
| Copper content, p.p.m. | 1,000 | 130 |
| Percent copper extracted |  | 87 |

EXTRACTION OF SILVER FROM CYANIDE COMPLEXES

Example XI 0.334 gram of silver acetate was dissolved in 300 cc. water and 2.8 grams of potassium cyanide then added. A complex of silver with cyanide was thus formed. 30 cc. of a 37% by weight aqueous solution of formaldehyde were added to the solution of the complex. Water was then added to bring the volume to 400 cc. Six grams of Permutit Q, a cation exchange resin, were suspended in the solution. The mixture was stirred for five hours and then filtered. The filtrate was analyzed for residual silver content. The analysis and other data obtained at the start and finish of the example are as follows:

|  | Start | Finish |
| --- | --- | --- |
| pH | 11.5 | 11.7 |
| Silver content, p.p.m. | 540 | 0 |
| Percent silver extracted |  | 100.0 |

Example XII

Example XI was repeated except that 11.5 grams of citric acid were dissolved in the mixture. The results were as follows:

|  | Start | Finish |
| --- | --- | --- |
| pH | 3.3 | 3.3 |
| Silver content, p.p.m. | 540 | 0 |
| Percent silver extracted |  | 100.0 |

Example XIII

Example No. XI was repeated except the temperature of the mixture was raised to 150° F. and the stirring time was two hours. The results were as follows:

|  | Start | Finish |
| --- | --- | --- |
| pH | 11.5 | 9.9 |
| Silver content, p.p.m. | 540 | 0 |
| Percent silver extracted |  | 100.0 |

Example XIV

Example XII was repeated except the temperature of the mixture was raised to 150° F. and the stirring time was two hours. The results are as follows:

|  | Start | Finish |
| --- | --- | --- |
| pH | 3.3 | 3.3 |
| Silver content, p.p.m. | 540 | 125 |
| Percent silver extracted |  | 77.0 |

EXTRACTION OF PALLADIUM FROM CYANIDE COMPLEXES

Example XV 0.145 gram palladium chloride, containing 59% by weight of palladium, was dissolved in 300 cc. water and 2.8 grams of potassium cyanide then added. A complex of palladium with cyanide was thus formed. This was followed by the addition of 30 cc. of a 37% formaldehyde solution to the palladium complex. Water was then added to bring the volume to 400 cc. Five grams of chelating resin which was a polyamidoxime resin in granular form prepared from polyacrylonitrile and containing 40% by weight of amidoxime groups were dispersed in the solution. The mixture was stirred for five hours and then filtered. The filtrate was analyzed for residual palladium content. The analysis and other data obtained at the start and finish of the example are as follows:

|  | Start | Finish |
| --- | --- | --- |
| pH | 11.9 | 11.6 |
| Palladium content, p.p.m | 214 | 69 |
| Percent palladium extracted |  | 67.8 |

Example XVI

Example No. XV was repeated except that formaldehyde bisulfite addition project was used in place of formaldehyde. The formaldehyde bisulfite was prepared by mixing 30 cc. of a 37% by weight aqueous solution of formaldehyde with a solution of 38 grams of sodium metabisulfite in 70 cc. water. The results are as follows:

|  | Start | Finish |
| --- | --- | --- |
| pH | 9.0 | 8.6 |
| Palladium content, p.p.m | 214 | 51 |
| Percent palladium extracted |  | 76.2 |

Example XVII

Example XV was repeated except that 11.5 grams of citric acid were added to the mixture. The data are as follows:

|  | Start | Finish |
| --- | --- | --- |
| pH | 3.3 | 3.5 |
| Palladium content, p.p.m | 214 | 5.4 |
| Percent palladium extracted |  | 97.4 |

Example XVIII

Example XVI was repeated except that 11.5 grams of citric acid were added to the mixture. The results are as follows:

|  | Start | Finish |
| --- | --- | --- |
| pH | 3.0 | 3.4 |
| Palladium content, p.p.m | 214 | 15 |
| Percent palladium extracted |  | 93.0 |

Examples XIX, XX, XXI and XXII were carried out in the same manner as Examples XV, XVI, XVII and XVIII except that the temperature was raised to 150° F., and the stirring time was two hours. The results are as follows:

Example XIX

|  | Start | Finish |
| --- | --- | --- |
| pH | 11.9 | 9.7 |
| Palladium content, p.p.m | 214 | 9 |
| Percent palladium extracted |  | 95.8 |

Example XX

|  | Start | Finish |
| --- | --- | --- |
| pH | 9.0 | 8.0 |
| Palladium content, p.p.m | 214 | 24 |
| Percent palladium extracted |  | 88.9 |

Example XXI

|  | Start | Finish |
| --- | --- | --- |
| pH | 3.3 | 3.5 |
| Palladium content, p.p.m | 214 | 2.4 |
| Percent palladium extracted |  | 98.8 |

Example XXII

|  | Start | Finish |
| --- | --- | --- |
| pH | 3.0 | 3.4 |
| Palladium content, p.p.m | 214 | 16.5 |
| Percent palladium extracted |  | 92.4 |

EXTRACTION OF GOLD FROM NICKEL SOLUTIONS IN THE PRESENCE OF CYANIDE

Example XXIII

To a 200 cc. portion of a commercial plating solution containing 1% nickel and 825 p.p.m. gold, all complexed with cyanide, were added five grams of the chelating resin of Example II which was a polyamidoxime resin in granular form containing 40% by weight of amidoxime groups and 20 cc. of a 37% by weight aqueous solution of formaldehyde. The resulting solution now contained 750 p.p.m. of gold. The mixture was stirred for four hours and then filtered. The filtrate was analyzed for residual gold content. The results are as follows:

|  | Start | Finish |
| --- | --- | --- |
| pH | 13.3 | 11.0 |
| Gold content, p.p.m | 750 | 250 |
| Percent gold extracted |  | 66.7 |

The reason that the amount of extracted gold was only 66.7% can be explained as follows. At the alkaline pH's used in the example, the chelating resin picked up some nickel as well as the gold. The nickel thus saturated the chelating resin so that less gold was picked up.

Example XXIV

To a different 100 cc. portion of the plating solution used in Example XXIII having 825 p.p.m. of gold were added 20 cc. of a 37% by weight aqueous solution of formaldehyde, 80 cc. water, and sufficient concentrated sulfuric acid to lower the pH of the solution to 2.5. The resulting solution now contained 412.5 p.p.m. gold. Five grams of the same polyamidoxime resin used in Example XXIII were added and the mixture was stirred for three hours and then filtered. The filtrate was analyzed for residual gold content. The results are as follows:

|  | Start | Finish |
| --- | --- | --- |
| pH | 2.5 | 3.0 |
| Gold content, p.p.m | 412.5 | 56 |
| Percent gold chelated |  | 86.2 |

In this example, an acid pH was used during extraction. The pH was below that at which nickel can be chelated by the chelating resin. Hence, only traces of nickel were chelated and a much higher amount of gold was chelated than in the preceding example.

Example XXV

A. DISRUPTION OF GOLD AND NICKEL CYANIDE COMPLEXES AND CHELATION OF GOLD AND NICKEL

To a 200 gram portion of a commercial plating solution containing 1% nickel (10,000 p.p.m.) and 1,000 p.p.m. gold, all complexed with cyanide, were added 40 grams of a 37% by weight aqueous solution of formaldehyde. The mixture was left standing overnight. The next day five grams of a chelating resin, which was a polyamidoxime resin in granular form containing 40% by weight of amidoxime groups, were added and the mixture was stirred for six hours and then filtered. The filtrate was analyzed for residual gold content with the following results.

|  | Start | Finish |
|---|---|---|
| pH | 11.3 | 10.0 |
| Gold content, p.p.m. | 835 | 150 |
| Percent gold chelated |  | 82 |

B. DETERMINATION OF CHELATED NICKEL

After filtering, the chelated resin was washed with water and then treated at 25° C. with 100 cc. of 10% by weight aqueous sulfuric acid for 2 hours. The pH at this point was 0 and therefore low enough to elute any nickel which may have been chelated by the resin along with the gold. The mixture was then filtered and the filtrate analyzed for eluted nickel. The results are as follows:

Total nickel at start _____ mg__ 2000
Eluted nickel (chelated nickel) _____ mg__ 50
Percent nickel chelated _____ 2.5

C. DETERMINATION OF CHELATED GOLD

The resin, now freed of chelated nickel, was washed again with water and oxidized with a mixture of 200 cc. fuming nitric acid and 20 cc. concentrated hydrochloric acid. After evaporation, the residue was dissolved in a few drops of concentrated hydrochloric acid, diluted with water and analyzed for total gold. The results are:

Total gold at start _____ mg__ 200
Gold chelated _____ mg__ 164
Percent gold chelated _____ 82

ANALYTICAL METHODS FOR DETERMINATION OF GOLD, COPPER, SILVER AND PALLADIUM

The following general procedures were used to determine the amount of metals extracted from their cyanide complexes in the above examples. The analyses, as indicated above, were carried out on the filtrates obtained after the metals, which were freed from their cyanide complexes, were taken up with a resin and the resin then filtered. All filtrates were first oxidized with boiling nitric acid, dissolved in concentrated hydrochloric acid, evaporated to dryness and the residue dissolved in distilled water.

Gold

Gold was determined spectrophotometrically with the Rhodamine B method.

PROCEDURE

A series of gold solutions having known concentrations varying up to 30γ of Au (III) was prepared. Each solution was prepared by mixing 2.5 cc. of 6 M HCl, 5.0 cc. of saturated $NH_4Cl$ solution and a specific amount of aurochloric acid and then diluted to 15 cc. with water. 5 cc. of 0.04% Rhodamine B hydrochloride solution in water was added to each gold solution. Each gold solution was then shaken vigorously for one-half minute with 10 cc. of isopropyl ether in a separatory funnel. The transmittance of the clear ether extract of each solution was measured at 570 mμ on a Bausch & Lomb Spectronic 20 spectrophotometer. From this, a curve for the percent transmission at 570 mμ was plotted using the known concentrations of each gold solution and the measured percent transmission of each solution. The percent transmission of the gold solutions prepared by oxidizing, etc. the filtrates of the above examples which contained gold was determined at 570 mμ using the same Bausch & Lomb Spectronic 20 spectrophotometer. From this, the amount of gold present in the original filtrates was determined by comparison with the curve.

Copper

Copper was determined spectrophotometrically with the zinc dibenzyldithiocarbamate method.

PROCEDURE

A series of copper solutions having known concentrations varying up to 40γ of Cu (II) was prepared using $CuSO_4 \cdot 5H_2O$. 10 cc. of a 0.01% zinc dibenzyldithiocarbamate-carbon tetrachloride solution were added to each copper solution. Each copper solution was then shaken for 30 seconds in a separatory funnel. Then 100 cc. water and 6 cc. of 50% sulfuric acid solution were added to each solution which was then shaken for 30 seconds more. The phases were allowed to separate and the clear carbon tetrachloride solution was run in a beaker with a small amount of anhydrous $MgSO_4$ in order to dry the solution. After filtering, to remove the $MgSO_4$, the transmittance of each copper solution was measured at 435 mμ on the Bausch & Lomb Spectronic 20 spectrophotometer. From this, a curve for the percent transmission at 435 mμ was plotted using the known concentrations of each copper solution and the measured percent transmission of each solution. The percent transmission of the copper solutions prepared by oxidizing, etc., the filtrates of the above examples which contained copper was determined at 435 mμ using the same Bausch & Lomb Spectronic 20 spectrophotometer. From this, the amount of copper present in the original filtrates was determined by comparison with the curve.

Silver

Silver was determined gravimetrically as AgCl using 200 cc. of the filtered solution.

Palladium

Palladium was determined spectrophotometrically with the p-nitrosodiphenylamine method.

PROCEDURE

A series of palladium solutions having known concentrations varying up to 80γ of Pd (II) was prepared using palladium chloride. A suitable amount of each test solution was transferred to a 50 cc. volumetric flask. 10 cc. of sodium acetate-hydrochloric acid mixture (0.2 molar as sodium acetate and 0.25 molar as HCl) and 10 cc. of 0.005% p-nitrosodiphenylamine solution in 50% ethanol-water solution were then added. Water was added to the 50 cc. mark, mixed and allowed to stand for 30 minutes. The transmittance of each of the palladium solutions at 525 mμ was measured on the Bausch & Lomb Spectronic 20 spectrophotometer. From this, a curve for the percent transmission at 525 mμ was plotted using the known concentrations of each palladium solution and the measured percent transmission of each solution. The percent transmission of the palladium solutions prepared by oxidizing, etc., the filtrates of the above examples which contained palladium was determined at 525 mμ using the same Bausch & Lomb spectrophotometer, and the amount of palladium present in the original filtrates was determined by comparison with the curve.

What we claim as new and desire to secure by Letters Patent is:

1. A process for recovering metals from cyanide complexes of said metals comprising the steps of contacting said complex in aqueous solution with at least one material selected from the group consisting of water-soluble aldehydes and compositions liberating water-soluble aldehydes and thereafter recovering the resulting liberated metal.

2. The process of claim 1 including the step of recovering said metal with a cation exchange resin.

3. The process of claim 1 including the step of recovering said metal with a chelating resin.

4. A process for recovering metals from cyanide complexes of said metals comprising the steps of contacting said complex in an aqueous solution with at least one material selected from the group consisting of water-soluble aldehydes and compositions liberating water-soluble aldehydes in an amount at least equivalent to said cyanide in said complex and at a pH from about 1 to about 12 and thereafter recovering said metal.

5. The process of claim 4 in which said material is present in an amount which is at least a 10% excess over stoichiometric amounts with respect to the amount of cyanide in said complex.

6. The process of claim 5 including the step of recovering said metal with a cation exchange resin.

7. The process of claim 5 including the step of recovering said metal with a chelating resin.

8. The process of claim 5 in which said aldehyde is formaldehyde.

9. The process of claim 5 in which said aldehyde is paraformaldehyde.

10. The process of claim 5 in which said aldehyde is formaldehyde bisulfite addition product.

11. A process for recovering gold from a cyanide complex containing same comprising the steps of contacting an aqueous solution of said complex with a water-soluble aldehyde and thereafter recovering the resulting liberated gold.

12. A process for recovering silver from a cyanide complex containing same comprising the steps of contacting an aqueous solution of said complex with a water-soluble aldehyde and thereafter recovering the resulting liberated silver.

13. A process for recovering palladium from a cyanide complex containing same comprising the steps of contacting an aqueous solution of said complex with a water-soluble aldehyde and thereafter recovering the resulting liberated palladium.

14. A process for recovering copper from a cyanide complex containing same comprising the steps of contacting an aqueous solution of said complex with a water-soluble aldehyde and thereafter recovering the resulting liberated copper.

References Cited by the Examiner

UNITED STATES PATENTS

| | | |
|---|---|---|
| 2,371,119 | 3/45 | Nachod. |
| 3,088,799 | 5/63 | Fetscher _____ 75—121 |

OTHER REFERENCES

Nachod et al.: Ion Exchange Technology, Academic Press Inc., New York, 1956, pp. 292 and 293 relied on.

BENJAMIN HENKIN, *Primary Examiner.*

DAVID L. RECK, *Examiner.*